United States Patent
Choi et al.

(10) Patent No.: US 9,596,646 B2
(45) Date of Patent: Mar. 14, 2017

(54) BLACKLISTING TECHNIQUES FOR DETECTED SET EVENT EVALUATION

(71) Applicant: Intel IP Corporation, Santa Clara, CA (US)

(72) Inventors: Hyung-Nam Choi, Hamburg (DE); Michael Zitzmann, Nuremberg (DE); Jianjun Shen, Uterhaching (DE)

(73) Assignee: INTEL IP CORPORATION, Santa Clara, CA (US)

(*) Notice: Subject to any disclaimer, the term of this patent is extended or adjusted under 35 U.S.C. 154(b) by 97 days.

(21) Appl. No.: 14/583,527

(22) Filed: Dec. 26, 2014

(65) Prior Publication Data

US 2015/0327105 A1 Nov. 12, 2015

Related U.S. Application Data

(60) Provisional application No. 61/990,691, filed on May 8, 2014.

(51) Int. Cl.
*H04W 4/00* (2009.01)
*H04W 48/16* (2009.01)
*H04W 24/10* (2009.01)

(52) U.S. Cl.
CPC ........... *H04W 48/16* (2013.01); *H04W 24/10* (2013.01)

(58) Field of Classification Search
USPC ......... 370/328–334, 337–345; 455/436–438, 455/444–453
See application file for complete search history.

(56) References Cited

U.S. PATENT DOCUMENTS

| 8,073,453 | B2* | 12/2011 | Funnell | H04W 48/16 370/328 |
|---|---|---|---|---|
| 2004/0032845 | A1* | 2/2004 | Chen | H04W 36/36 370/338 |
| 2011/0117916 | A1 | 5/2011 | Dahlen | |
| 2011/0281587 | A1 | 11/2011 | Jokinen et al. | |

(Continued)

FOREIGN PATENT DOCUMENTS

EP 2434806 3/2012

OTHER PUBLICATIONS

Hisilicon, Huawei, "Allow network to exclude some cells being detected and reported in intra&inter-freq detected set operation", 3GPP TSG-RAN2, R2-126133, Change Request 25.331, 5252 rev 2 Current Version 11.3.0, , Nov. 12-16, 2012, 23 pages.

(Continued)

*Primary Examiner* — Dai A Phuong

(57) ABSTRACT

Blacklisting techniques for detected set event evaluation are described. In one embodiment, for example, user equipment (UE) may comprise at least one radio frequency (RF) transceiver, at least one RF antenna, and logic, at least a portion of which is in hardware, the logic to receive a measurement control message comprising a remotely-selected event evaluation blacklist (EEB) for a wireless communication frequency, determine whether a local EEB exists for the wireless communication frequency, and in response to a determination that a local EEB exists for the wireless communication frequency, replace the contents of the local EEB with the contents of the remotely-selected EEB. Other embodiments are described and claimed.

25 Claims, 9 Drawing Sheets

(56) References Cited

U.S. PATENT DOCUMENTS

| | | | | |
|---|---|---|---|---|
| 2012/0231782 A1* | 9/2012 | Hellander | | H04W 24/10 455/422.1 |
| 2013/0217392 A1* | 8/2013 | Shi | | H04W 24/02 455/436 |
| 2014/0024375 A1 | 1/2014 | Fitzpatrick et al. | | |
| 2014/0206329 A1* | 7/2014 | Martin | | H04W 24/10 455/418 |
| 2015/0156688 A1* | 6/2015 | Ishida | | H04W 36/0083 455/444 |
| 2016/0219473 A1* | 7/2016 | Teyeb | | H04W 36/0088 |
| 2016/0285578 A1* | 9/2016 | Webb | | H04W 52/143 |

OTHER PUBLICATIONS

"Clarification to configuration of the list of cells to be excluded from inter-frequency detected set measurements", 3GPP TSG-RAN WG2, R2-141152, Change Request 25.331, Current Version 11.9.0, Intel Corporation, 10 pages, (Author Unknown).

"Universal Mobile Telecommunications Systems (UMTS); UE Radio Access capabilities",(ETSI, 3GPP TS 25.306 V10.2.0 Release 10, pp. 1-32, (Author unknown).

"Universal Mobile Telecommunications Systems (UMTS); UE Radio Access capabilities",(ETSI, 3GPP TS 25.306 V10.2.0 Release 10, pp. 33-64, (Author unknown).

"Universal Mobile Telecommunications Systems (UMTS);Radio Resource Control (RRC) Protocol specification", 3GPP TS25.331 V11.9.0 (Mar. 2014), pp. 297-314, (Author unknown).

"Universal Mobile Telecommunications Systems (UMTS);Radio Resource Control (RRC) Protocol specification", 3GPP TS25.331 V11.9.0 (Mar. 2014), pp. 315-332, (Author unknown).

International Search Report and Written Opinion received for PCT Patent Application No. PCT/US2015/024824, mailed Jul. 29, 2015, 15 pages.

\* cited by examiner

*200*

Broadband Wireless Access System
900

BLACKLISTING TECHNIQUES FOR DETECTED SET EVENT EVALUATION

RELATED CASE

This application claims priority to U.S. Provisional Patent Application No. 61/990,691, filed May 8, 2014, the entirety of which is hereby incorporated by reference.

TECHNICAL FIELD

Embodiments herein generally relate to communications between devices in broadband wireless communications networks.

BACKGROUND

A radio network controller (RNC) in a Universal Mobile Telecommunications System (UMTS) Terrestrial Radio Access Network (UTRAN) can configure a user equipment (UE) to perform intra-frequency detected set measurements (DSMs) and/or inter-frequency DSMs. The intra-frequency DSMs may generally comprise DSMs associated with detected set cells operating at a frequency used by the UE ("the used frequency"), while the inter-frequency DSMs may generally comprise DSMs associated with detected set cells operating at other frequencies ("non-used frequencies"). In conjunction with configuring the UE to perform intra-frequency DSMs and/or inter-frequency DSMs, the RNC may configure the UE to perform event evaluation based on such DSMs. With respect to a given detected set cell, event evaluation may generally involve determining whether one or more defined events have occurred based on the DSMs for that detected set cell. Event evaluation may also involve reporting information regarding the detected set cell to the RNC if any such events are determined to have occurred.

In some cases, such as those that may be characteristic of dense deployments, the cells that may be detected by a given UE may include a large number of cells. Under such circumstances, performing event evaluation for the entire detected set cells may significantly increase the signaling exchange between UE and RNC in terms of e.g. measurement reporting, handover triggering. In order to enable reduction of this signaling overhead, it may be desirable that the UE be configurable to exclude one or more detected set cells from event evaluation.

DETAILED DESCRIPTION

Figure 1:
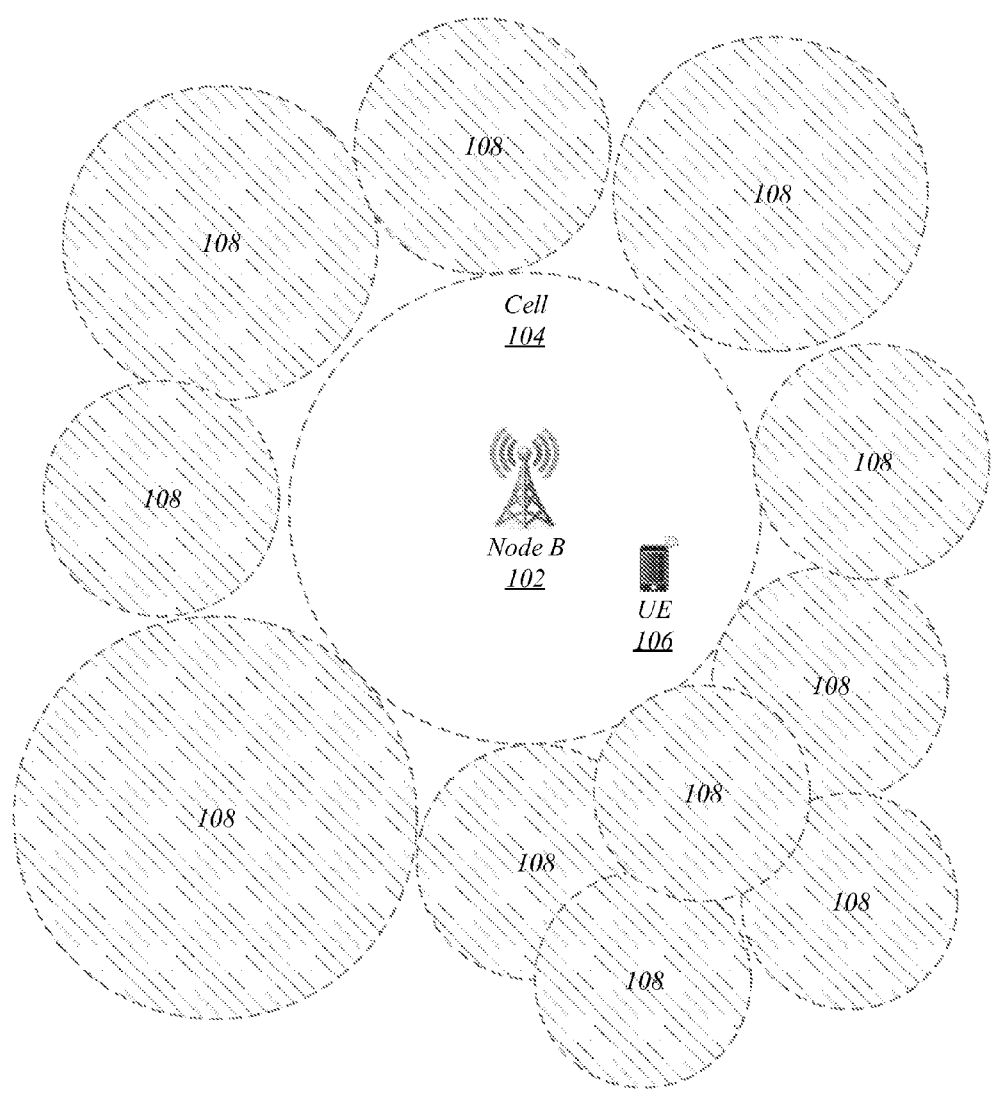
FIG. 1 illustrates an embodiment of a first operating environment.

Various embodiments may be generally directed to blacklisting techniques for detected set event evaluation. In one embodiment, for example, user equipment (UE) may comprise at least one radio frequency (RF) transceiver, at least one RF antenna, and logic, at least a portion of which is in hardware, the logic to receive a measurement control message comprising a remotely-selected event evaluation blacklist (EEB) for a wireless communication frequency, determine whether a local EEB exists for the wireless communication frequency, and in response to a determination that a local EEB exists for the wireless communication frequency, replace the contents of the local EEB with the contents of the remotely-selected EEB. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an operating environment 100 according to the UTRAN. The UTRAN consists of a plurality of radio network subsystems (RNS) where each RNS consists of a radio network control unit (Radio Network Controller, RNC) to which one or more base stations (node B) are associated with. In operating environment 100, a RNC (not shown in operating environment 100) monitors and controls the allocation of radio resources in all radio cells in a radio network subsystem, and a node B 102 generally provides wireless connectivity within a cell 104. In conjunction with obtaining wireless service from node B 102, a UE 106 that is located within cell 104 operates in a connected mode CELL_DCH radio resource control (RRC) state. As UE 106 operates in the connected mode CELL_DCH RRC state, various other cells 108 may be located within sufficient proximity to UE 106 to enable UE 106 to detect them. Each cell 108 that UE 106 detects may be categorized into either an active set, a monitored set, or a detected set. The active set may comprise cells 108 that have established dedicated physical channels (DPCH) in uplink (UL) and downlink (DL) with the UE 106. The monitored set may comprise cells 108 that are not included in the active set but that are included in a CELL_INFO_LIST that is configured by RNC through measurement control message or system information, and is to be maintained by UE 106. The detected set may comprise cells 108 that UE 106 has detected but that are not included in either the active set or the monitored set. As shown in FIG. 1, the respective sizes of the various cells 108 may vary, there may be overlap between multiple cells 108, and the deployment density of cells 108 may be greater in some areas than in other areas.

While UE 106 operates in the CELL_DCH RRC state, node B 102 may send measurement control information received from its associated RNC to UE 106 in order to instruct UE 106 to perform various types of measurements and event evaluations, which may include measurements and event evaluations associated with cells 108 that are comprised in the detected set for UE 106. More particularly, RNC may instruct UE 106 to perform intra-frequency DSMs and event evaluations and/or inter-frequency DSMs and event evaluations. If a large number of cells 108 are comprised in the detected set for UE 106, requiring UE 106 to perform event evaluations for the entire detected set may significantly increase the signaling exchange between UE 106 and RNC. As such, it may be desirable that RNC be able to configure UE 106 to exclude one or more detected set cells from event evaluation.

Disclosed herein are blacklisting techniques for detected set event evaluation. According to the disclosed techniques, a RNC may configure a UE such as UE 106 to exclude one or more detected set cells from one or more event evaluations. More particularly, in some embodiments, the RNC may configure the UE with one or more event evaluation blacklists (EEBs), each of which may identify one or more detected set cells to be excluded from one or more event evaluations. In various embodiments, each EEB may correspond to a different wireless communication frequency. In some embodiments, the one or more EEBs may include an intra-frequency EEB that applies to intra-frequency DSMs. In various embodiments, the one or more EEBs may additionally or alternatively include one or more inter-frequency EEBs, each of which may correspond to inter-frequency DSMs associated with a different respective non-used frequency of the UE. The embodiments are not limited in this context.

Figure 2:
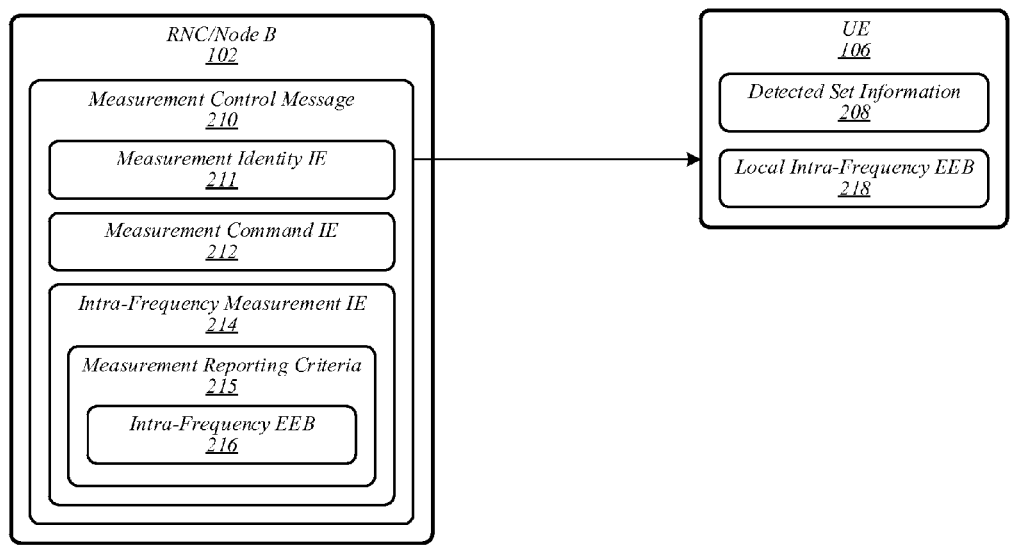
FIG. 2 illustrates an embodiment of a second operating environment.

FIG. 2 illustrates an example of an operating environment 200 in which communications may be exchanged between RNC and UE 106 of FIG. 1 in conjunction with the application of blacklisting techniques for detected set event evaluation in some embodiments. In operating environment 200, UE 106 may be operative to maintain detected set information 208. At any given point in time, may generally comprise information identifying the cell(s) currently comprised in the detected set for UE 106. In various embodiments, detected set information 208 may additionally comprise information describing characteristics of the cell(s) comprised in the detected set. For example, in some embodiments, detected set information 208 may additionally comprise information identifying the respective operating frequencies of the cell(s) in the detected set. In various embodiments, detected set information 208 may comprise information identifying an intra-frequency detected set that comprises one or more detected set cells that operate at the same wireless communication frequency as does UE 106. In some embodiments, detected set information 208 may additionally or alternatively comprise information identifying an inter-frequency detected set that comprises one or more detected set cells that operate at other respective wireless communication frequencies. The embodiments are not limited in this context.

In various embodiments, RNC may send a measurement control message 210 to UE 106 in order to configure UE 106 to perform one or more intra-frequency measurements. In some embodiments, measurement control message 210 may configure UE 106 to perform one or more intra-frequency DSMs. In various embodiments, measurement control message 210 may also configure UE 106 to perform one or more event evaluations based on those intra-frequency DSMs. In some embodiments, measurement control message 210 may comprise a "MEASUREMENT CONTROL" message according to 3GPP TS 25.331 v. 11.9.0 (March 2014), and/or any predecessors, variations, and/or progeny thereof (collectively, "3GPP TS 25.331"). In various embodiments, RNC may be operative to send measurement control message 210 to UE 106 over a dedicated control channel (DCCH). The embodiments are not limited in this context.

In some embodiments, measurement control message 210 may include a measurement identity 211. In various embodiments, measurement identity 211 may comprise an information element (IE) that contains an identifier associated with the set of measurement(s) configured by measurement control message 210. In some embodiments, measurement control message 210 may comprise a measurement command IE 212 that contains a value indicating whether measurement control message 210 is intended to setup, modify, or release the set of measurement(s) that it configures. The embodiments are not limited in this context.

In various embodiments, measurement control message 210 may include an intra-frequency measurement IE 214. In some embodiments, the presence of intra-frequency measurement IE 214 in measurement control message 210 may constitute an indication that the measurement(s) configured via measurement control message 210 are intra-frequency measurements. In various embodiments, intra-frequency measurement IE 214 may comprise information specifying one or more parameters according to which UE 106 is to perform one or more intra-frequency measurements.

In some embodiments, intra-frequency measurement IE 214 may also comprise information specifying one or more parameters according to which UE 106 is to perform intra-frequency event evaluation and/or measurement reporting. In various embodiments, for example, intra-frequency measurement IE 214 may comprise a measurement reporting criteria IE 215 that contains information characterizing the manner in which UE 106 is to perform event evaluation and measurement reporting based on intra-frequency measurements configured by measurement control message 210. In some embodiments, measurement reporting criteria IE 215 may comprise information indicating one or more intra-frequency events that can be triggered by intra-frequency DSMs. In various embodiments, measurement reporting criteria 215 may comprise an "Intra-frequency measurement reporting criteria" IE according to 3GPP TS 25.331. The embodiments are not limited in this context.

In some embodiments, measurement reporting criteria IE 215 may contain information that particularly characterizes the manner in which UE 106 is to perform event evaluation and measurement reporting based on intra-frequency DSMs configured by measurement control message 210. In various embodiments, measurement reporting criteria IE 215 may comprise an intra-frequency EEB 216. In some embodiments, intra-frequency EEB 216 may comprise a list of one or more cells to be excluded from event evaluation for intra-frequency DSMs. In various embodiments, intra-frequency EEB 216 may comprise a "Cells to be excluded in detected set cells" IE according to 3GPP TS 25.331. The embodiments are not limited in this context.

In some embodiments, upon receipt of measurement control message 210 from RNC, UE 106 may be operative to determine whether a local intra-frequency EEB 218 exists. In various embodiments, local intra-frequency EEB 218 may comprise an intra-frequency EEB that UE 106 creates, maintains, and/or modifies based on instructions received from RNC, and that UE 106 uses to identify detected set cells to be excluded from intra-frequency DSM event evaluation. An intra-frequency EEB—such as intra-frequency EEB 216—that RNC sends to UE 106 in order to provision/modify local intra-frequency EEB 218 may be referred to as a "remotely-generated" intra-frequency EEB. In some embodiments, in response to a determination that local intra-frequency EEB 218 exists, UE 106 may be operative to replace the contents of local intra-frequency EEB 218 with the contents of the remotely-generated intra-frequency EEB 216 comprised in measurement control message 210. In various embodiments, in response to a determination that local intra-frequency EEB 218 does not exist, UE 106 may be operative to create local intra-frequency EEB 218 and populate it with the contents of intra-frequency EEB 216. The embodiments are not limited in this context.

In some embodiments, UE 106 may subsequently be operative to perform intra-frequency measurements in accordance with parameters specified in measurement control message 210. In various embodiments, the intra-frequency measurements may include intra-frequency DSMs. In some embodiments, UE 106 may be configured to perform event evaluation based on those intra-frequency DSMs. In various embodiments, UE 106 may be configured to exclude one or more intra-frequency detected set cells comprised in local intra-frequency EEB 218 from the event evaluation. In some embodiments in which it creates local intra-frequency EEB 218 in response to receipt of measurement control message 210, UE 106 may maintain and apply local intra-frequency EEB 218 until the measurement identity associated with measurement control message 210 is released. In other such embodiments, UE 106 may maintain and apply local intra-frequency EEB 218 until all measurement identities associated with measurement objects configured on the used frequency are released. In various embodiments in which it creates local intra-frequency EEB 218 in response to receipt of measurement control message 210, upon subsequent receipt of a release notification message identifying a given measurement identity associated with the used frequency, UE 106 may be operative to maintain local intra-frequency EEB 218 if it determines that the given measurement identity differs from measurement identity 211. The embodiments are not limited in this context.

In some embodiments, UE 106 may comprise a Dual Cell High-Speed Uplink Packet Access (DC-HSUPA)-capable UE. In various such embodiments, measurements on the downlink (DL) frequency associated with the secondary uplink (UL) frequency of UE 106 may be configured via an intra-frequency measurement IE such as intra-frequency measurement IE 214. In some embodiments, UE 106 may be configured not to apply intra-frequency EEB 216—or any intra-frequency EEB—to measurements on the downlink (DL) frequency associated with the secondary UL frequency. The embodiments are not limited in this context.

Figure 3:
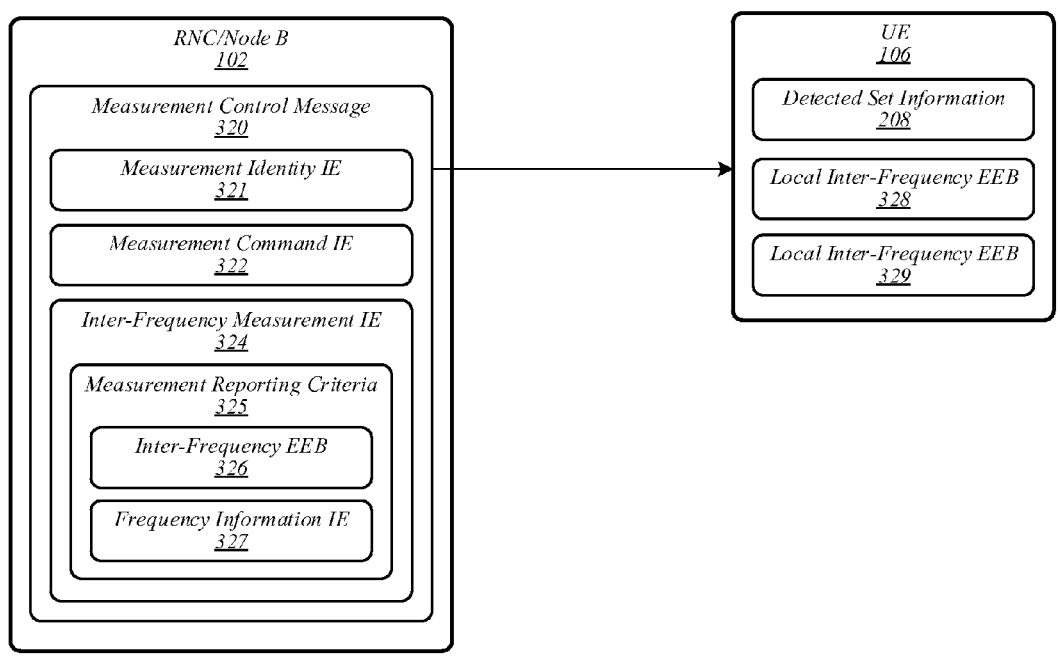
FIG. 3 illustrates an embodiment of a third operating environment.

FIG. 3 illustrates an example of an operating environment 300 in which communications may be exchanged between RNC and UE 106 of FIG. 1 in conjunction with the application of blacklisting techniques for detected set event evaluation in various embodiments. In operating environment 300, RNC may send a measurement control message 320 to UE 106 in order to configure UE 106 to perform one or more inter-frequency measurements. In some embodiments, measurement control message 320 may configure UE 106 to perform one or more inter-frequency DSMs. In various embodiments, measurement control message 320 may also configure UE 106 to perform one or more event evaluations based on those inter-frequency DSMs. In some embodiments, measurement control message 320 may comprise a "MEASUREMENT CONTROL" message according to 3GPP TS 25.331. In various embodiments, RNC may be operative to send measurement control message 320 to UE 106 over a DCCH. The embodiments are not limited in this context.

In some embodiments, measurement control message 320 may include a measurement identity 321. In various embodiments, measurement identity 321 may comprise an IE that contains an identifier associated with the set of measurement(s) configured by measurement control message 320. In some embodiments, measurement control message 320 may comprise a measurement command IE 322 that contains a value indicating whether measurement control message 320 is intended to setup, modify, or release the set of measurement(s) that it configures. The embodiments are not limited in this context.

In various embodiments, measurement control message 320 may include an inter-frequency measurement IE 324. In some embodiments, the presence of inter-frequency measurement IE 324 in measurement control message 320 may constitute an indication that the measurement(s) configured via measurement control message 320 are inter-frequency measurements. In various embodiments, inter-frequency measurement IE 324 may comprise information specifying one or more parameters according to which UE 106 is to perform one or more inter-frequency measurements.

In some embodiments, inter-frequency measurement IE 324 may also comprise information specifying one or more parameters according to which UE 106 is to perform inter-frequency event evaluation and/or measurement reporting. In various embodiments, for example, inter-frequency measurement IE 324 may comprise a measurement reporting criteria IE 325 that contains information characterizing the manner in which UE 106 is to perform event evaluation and measurement reporting based on inter-frequency measurements configured by measurement control message 320. In some embodiments, measurement reporting criteria IE 325 may comprise information indicating one or more inter-frequency events that can be triggered by inter-frequency DSMs. In various embodiments, measurement reporting criteria IE 325 may comprise an "Inter-frequency measurement reporting criteria" IE according to 3GPP TS 25.331. The embodiments are not limited in this context.

In some embodiments, measurement reporting criteria IE 325 may contain information that particularly characterizes the manner in which UE 106 is to perform event evaluation and measurement reporting based on inter-frequency DSMs configured by measurement control message 320. In various embodiments, measurement reporting criteria IE 325 may comprise an inter-frequency EEB 326. In some embodiments, inter-frequency EEB 326 may comprise a list of one or more cells to be excluded from event evaluation for inter-frequency DSMs. In various embodiments, inter-frequency EEB 326 may comprise a "Cells to be excluded in non-used frequency detected cells" IE according to 3GPP TS 25.331. The embodiments are not limited in this context.

In some embodiments, UE 106 may be configured with the capability of recognizing, maintaining, and applying multiple inter-frequency EEBs, each corresponding to a different non-used frequency of UE 106. As such, in various embodiments, RNC may be operative to include a frequency information IE 327 in measurement reporting criteria 325, and the frequency information IE 327 may comprise information identifying a particular non-used frequency $f_A$ to which inter-frequency EEB 326 corresponds. In some such embodiments, frequency information IE 327 may comprise a frequency index for $f_A$. The embodiments are not limited in this context.

In various embodiments, upon receipt of measurement control message 320 from RNC, UE 106 may be operative to determine whether a local inter-frequency EEB exists for $f_A$. In some embodiments, UE 106 may be operative to identify $f_A$ based on frequency information IE 327. In various embodiments, a single local inter-frequency EEB 328 may exist at UE 106, and UE 106 may determine whether a local inter-frequency EEB exists for $f_A$ based on whether that single local inter-frequency EEB 328 applies to $f_A$. In some embodiments, multiple local inter-frequency EEBs may exist at UE 106, and UE 106 may determine whether a local inter-frequency EEB exists for $f_A$ based on whether any of the multiple local inter-frequency EEBs apply to $f_A$. In an example embodiment, a local inter-frequency EEB 328 may exist that applies to a frequency $f_1$, a local inter-frequency EEB 329 may exist that applies to a frequency $f_2$, and UE 106 may determine that a local inter-frequency EEB exists for $f_A$ if either $f_1$ or $f_2$ matches $f_A$. The embodiments are not limited to this example.

In various embodiments, in response to a determination that a local inter-frequency EEB exists for $f_A$, UE 106 may be operative to replace the contents of that local inter-frequency EEB with the contents of the remotely-generated inter-frequency EEB 326 comprised in measurement control message 320. For example, in response to a determination that an existing local inter-frequency EEB 329 applies to $f_A$, UE 106 may be operative to replace the contents of the existing local inter-frequency EEB 329 with the contents of inter-frequency EEB 326. In some embodiments, in response to a determination that no local inter-frequency EEB exists for $f_A$, UE 106 may be operative to create a local inter-frequency EEB for $f_A$ and populate it with the contents of inter-frequency EEB 326. For example, in response to a determination that a sole existing local inter-frequency EEB 328 does not apply to $f_A$, UE 106 may be operative to create local inter-frequency EEB 329 and populate it with the contents of inter-frequency EEB 326. The embodiments are not limited to these examples.

In various embodiments, UE 106 may subsequently be operative to perform inter-frequency measurements in accordance with parameters specified in measurement control message 320. In some embodiments, the inter-frequency measurements may include inter-frequency DSMs performed on the frequency $f_A$. In various embodiments, UE 106 may be configured to perform event evaluation based on those inter-frequency DSMs. In some embodiments, UE 106 may be configured to exclude one or more inter-frequency detected set cells comprised in a local inter-frequency EEB—such as local inter-frequency EEB 328 or local inter-frequency EEB 329—from an event evaluation that it conducts based on inter-frequency DSMs performed on the frequency $f_A$.

In various embodiments in which it creates a local inter-frequency EEB in response to receipt of measurement control message 320, UE 106 may maintain and apply that local inter-frequency EEB until the measurement identity associated with measurement control message 320 is released. In other such embodiments, UE 106 may maintain and apply that local inter-frequency EEB until all measurement identities associated with measurement objects configured on the frequency $f_A$ are released. In some embodiments in which it creates a local inter-frequency EEB in response to receipt of measurement control message 320, upon subsequent receipt of a release notification message identifying a given measurement identity associated with the frequency $f_A$, UE 106 may be operative to maintain that local inter-frequency EEB if it determines that the given measurement identity differs from measurement identity 321. The embodiments are not limited in this context.

In various embodiments, RNC may only be permitted to include—and UE 106 may only be able to properly receive—at most one inter-frequency EEB in any given measurement control message. In some such embodiments, RNC may still be able to configure UE 106 with multiple inter-frequency EEBs by sending multiple measurement control messages. In various other embodiments, RNC may be may be permitted to include—and UE 106 may be capable of properly receiving—multiple inter-frequency EEBs in a single measurement control message. It is to be appreciated that in some embodiments in which multiple inter-frequency EEBs can be passed to UE 106 in a same measurement control message, RNC may nonetheless elect to use separate measurement control messages to pass multiple respective inter-frequency EEBs to UE 106. The embodiments are not limited in this context.

As previously noted in the discussion of operating environment 200 of FIG. 2, in various embodiments, UE 106 may be configured not to apply an intra-frequency EEB to measurements on a downlink frequency associated with a secondary UL frequency. In some embodiments, UE 106 may be configured not to apply any event evaluation blacklist to measurements on the downlink frequency associated with the secondary UL frequency. In various other embodiments, UE 106 may be configured with the ability to apply an inter-frequency EEB to measurements on the downlink frequency associated with the secondary UL frequency. In some embodiments, RNC may configure an inter-frequency EEB for the downlink frequency associated with the secondary UL frequency by sending a measurement control message such as measurement control message 320. In various embodiments, for example, frequency information IE 327 may comprise a frequency index for a downlink frequency associated with a secondary UL frequency of UE 106, and UE 106 may create or modify a local inter-frequency EEB for the downlink frequency associated with the secondary UL frequency in response to receipt of measurement control message 320. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
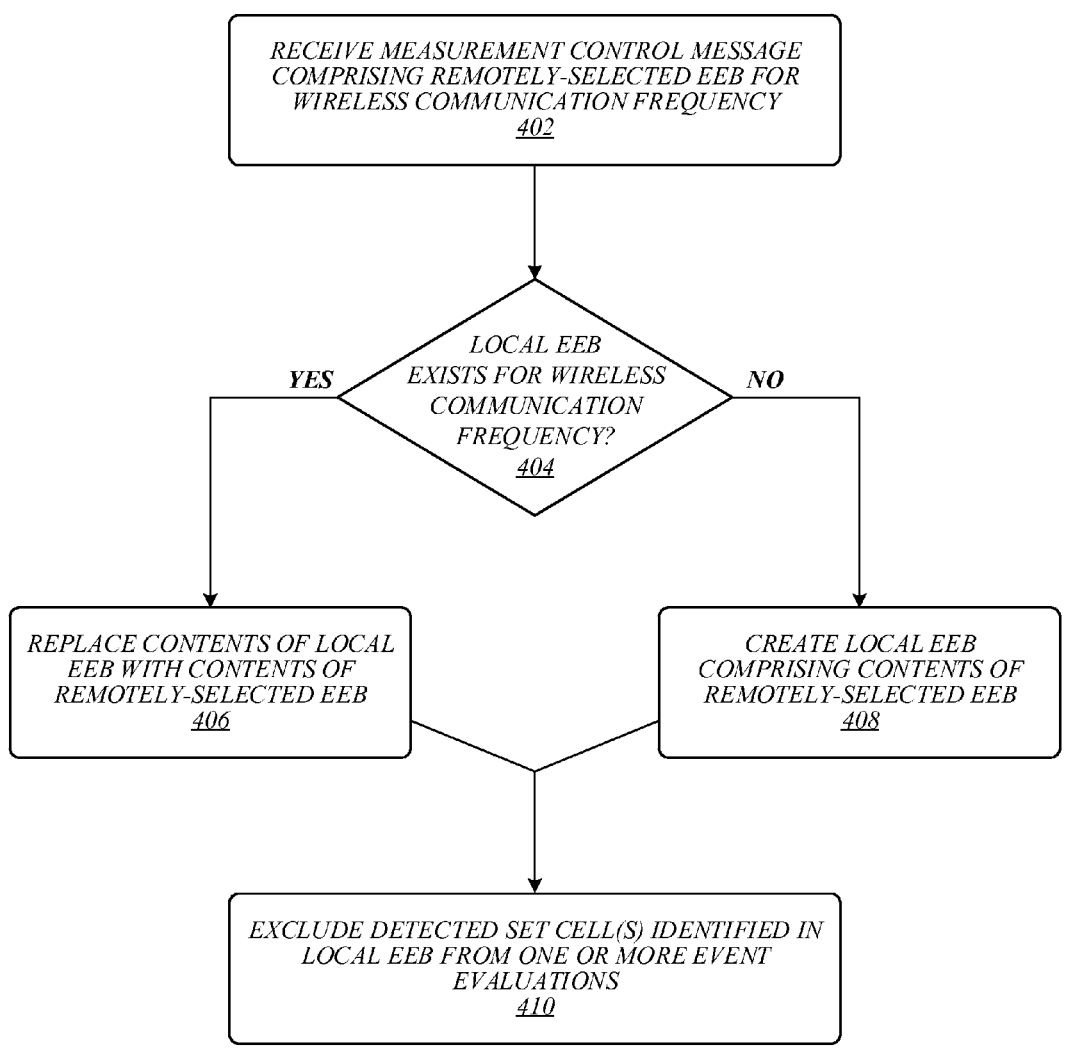
FIG. 4 illustrates an embodiment of a first logic flow.

FIG. 4 illustrates a logic flow 400, which may be representative of operations that may be performed in some embodiments by UE 106 of FIGS. 1, 2, and/or 3. As shown in logic flow 400, a measurement control message may be received at 402 that comprises a remotely-selected event evaluation blacklist for a wireless communication frequency. For example, UE 106 may be operative to receive a measurement control message from RNC that comprises a remotely-selected EEB for a wireless communication frequency. At 404, it may be determined whether a local EEB exists for the wireless communication frequency. For example, UE 106 may be operative to determine whether a local EEB exists for a wireless communication frequency for which RNC has sent a remotely-generated EEB.

If it is determined at 404 that a local EEB exists for the wireless communication frequency, flow may pass to 406. At 406, the contents of the local EEB may be replaced with the contents of the remotely-selected EEB. For example, UE 106 may be operative to replace the contents of local intra-frequency EEB 218 of FIG. 2 with the contents of intra-frequency EEB 216. In another example, UE 106 may be operative to replace the contents of local inter-frequency EEB 328 with the contents of inter-frequency EEB 326. If it is determined at 404 that no local EEB exists for the wireless communication frequency, flow may pass to 408. At 408, a local EEB may be created for the wireless communication frequency and may comprise the contents of the remotely-selected EEB. For example, UE 106 may be operative to create local intra-frequency EEB 218 of FIG. 2 and populate it with the contents of intra-frequency EEB 216. In another example, UE 106 may be operative to create local inter-frequency EEB 328 and populate it with the contents of inter-frequency EEB 326. From either 406 or 408, flow may pass to 410.

At 410, the detected set cell(s) identified in the local EEB may be excluded from one or more event evaluations. For example, UE 106 may be operative to exclude the intra-frequency detected set cell(s) identified in local intra-frequency EEB 218 of FIG. 2 from one or more intra-frequency event evaluations. In another example, UE 106 may be operative to exclude the inter-frequency detected set cell(s) identified in local inter-frequency EEB 328 of FIG. 3 from one or more inter-frequency event evaluations. The embodiments are not limited to these examples.

Figure 5:
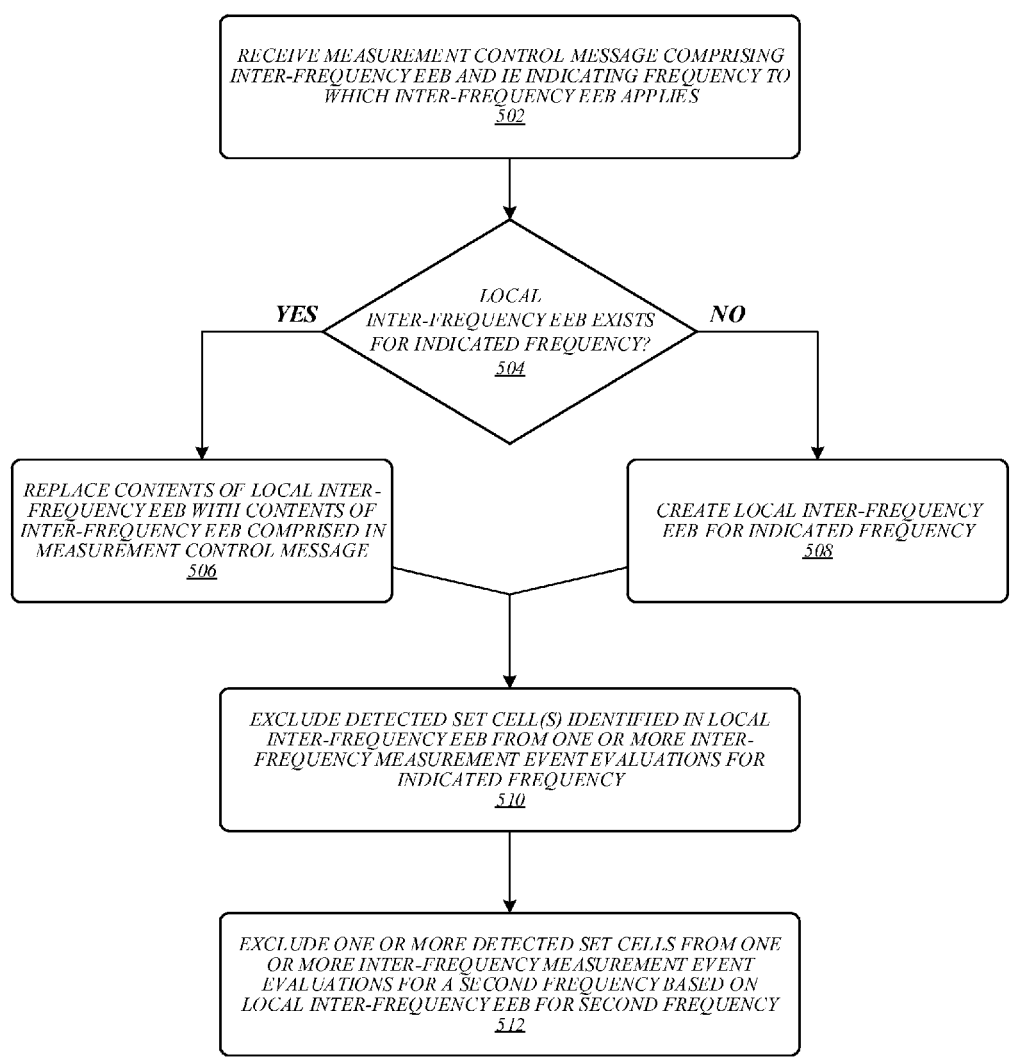
FIG. 5 illustrates an embodiment of a second logic flow.

FIG. 5 illustrates a logic flow 500, which may be representative of operations that may be performed in various embodiments by UE 106 of FIGS. 1, 2, and 3. As shown in logic flow 500, a measurement control message may be received at 502 that comprises an inter-frequency EEB and an IE indicating a frequency to which the inter-frequency EEB applies. For example, UE 106 may be operative to receive measurement control message 320 of FIG. 3, which may comprise inter-frequency EEB 326 and frequency information IE 327. At 504, it may be determined whether a local inter-frequency EEB exists for the frequency indicated by the IE. For example, UE 106 may be operative to determine whether a local inter-frequency EEB exists for a frequency indicated by frequency information IE 327.

If it is determined at 504 that a local inter-frequency EEB exists for the indicated frequency, flow may pass to 506. At 506, the contents of the local inter-frequency EEB may be replaced with the contents of the inter-frequency EEB comprised in the measurement control message. For example, following a determination that local inter-frequency EEB 328 of FIG. 3 applies to the frequency indicated by frequency information IE 327, UE 106 may be operative to replace the contents of local inter-frequency EEB 328 with the contents of inter-frequency EEB 326. If it is determined at 504 that no local inter-frequency EEB exists for the indicated frequency, flow may pass to 508. At 508, a local inter-frequency EEB may be created for the indicated frequency. For example, following a determination that local inter-frequency EEB 328 of FIG. 3 does not apply to the frequency indicated by frequency information IE 327, UE 106 may be operative to create local inter-frequency EEB 329 for that frequency and populate it with the contents of inter-frequency EEB 326. From either 506 or 508, flow may pass to 510.

At 510, the detected set cell(s) identified in the local inter-frequency EEB may be excluded from one or more inter-frequency measurement event evaluations for the indicated frequency. For example, UE 106 may be operative to exclude the inter-frequency detected set cell(s) identified in local inter-frequency EEB 328 of FIG. 3 from one or more inter-frequency event evaluations for the frequency indicated by frequency information IE 327. At 512, one or more detected set cells may be excluded from one or more inter-frequency measurement event evaluations for a second frequency based on a local inter-frequency EEB for the second frequency. For example, local inter-frequency EEB 329 of FIG. 3 may be associated with a different frequency than local inter-frequency EEB 328, and UE 106 may be operative to exclude one or more detected set cells from one or more inter-frequency measurement event evaluations for that different frequency based on local inter-frequency EEB 329. The embodiments are not limited to these examples.

Figure 6:
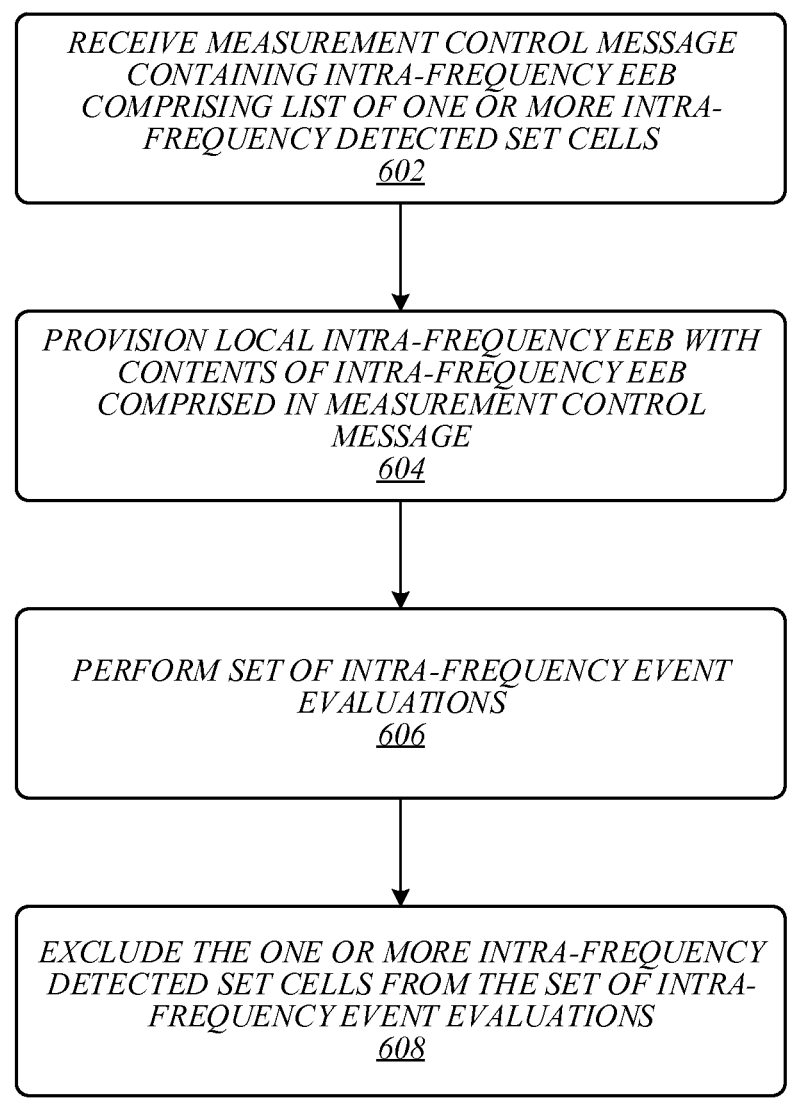
FIG. 6 illustrates an embodiment of a third logic flow.

FIG. 6 illustrates a logic flow 600, which may be representative of operations that may be performed in some embodiments by UE 106 of FIGS. 1, 2, and 3. As shown in logic flow 600, a measurement control message may be received at 602 that contains an intra-frequency EEB comprising a list of one or more intra-frequency detected set cells. For example, UE 106 may be operative to receive measurement control message 210 of FIG. 2, which may contain an intra-frequency EEB 216 comprising a list of one or more intra-frequency detected set cells. At 604, a local intra-frequency EEB may be provisioned with the contents of the intra-frequency EEB comprised in the measurement control message. For example, UE 106 may be operative to create local intra-frequency EEB 218 of FIG. 2 and populate it with the contents of intra-frequency EEB 216. In another example, UE 106 may be operative to replace the existing contents of local intra-frequency EEB 218 with the contents of intra-frequency EEB 216.

At 606, a set of intra-frequency event evaluations may be performed. For example, in operating environment 200 of FIG. 2, UE 106 may be operative to perform a set of one or more intra-frequency event evaluations. At 608, the one or more intra-frequency detected set cells comprised in the list received at 602 may be excluded from the set of intra-frequency event evaluations. For example, UE 106 may be operative to exclude the one or more intra-frequency detected set cells identified by the list comprised in intra-frequency EEB 216 of FIG. 2 from the aforementioned set of one or more intra-frequency event evaluations. The embodiments are not limited to these examples.

Figure 7:
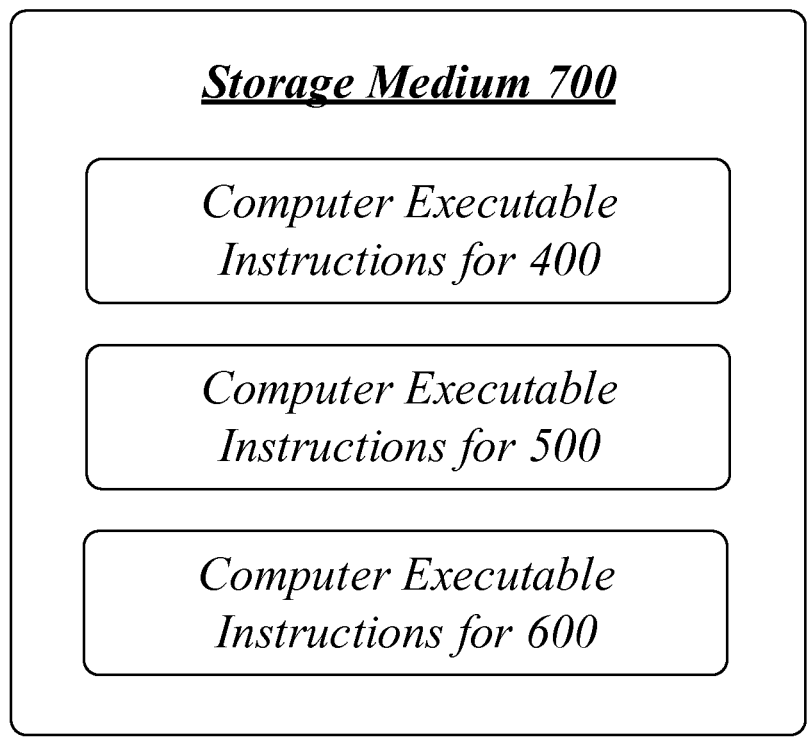
FIG. 7 illustrates an embodiment of a storage medium.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flow 400 of FIG. 4, logic flow 500 of FIG. 5, and logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
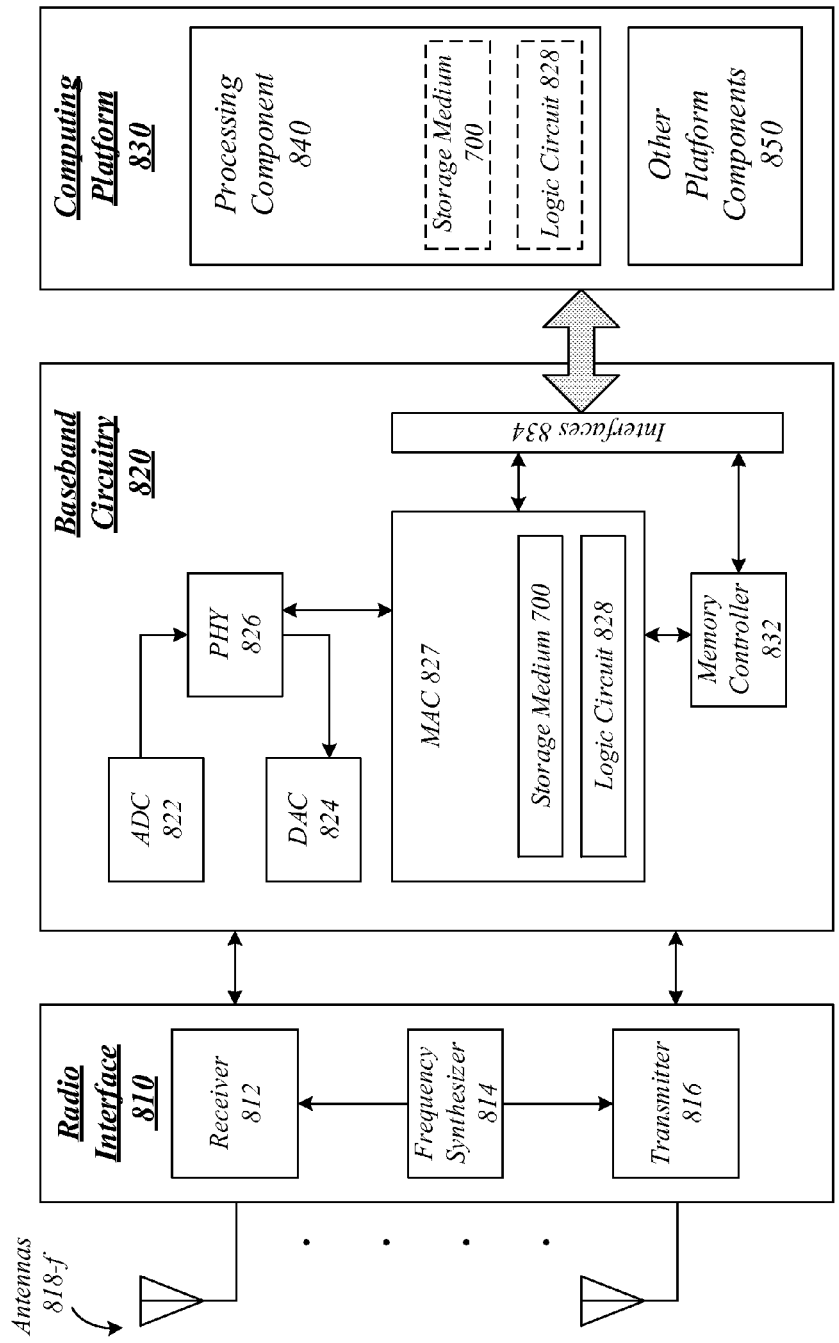
FIG. 8 illustrates an embodiment a device.

FIG. 8 illustrates an embodiment of a communications device 800 that may implement RNC and node B 102 of FIGS. 1, 2, and 3, UE 106 of FIGS. 1, 2, and 3, logic flow 400 of FIG. 4, logic flow 500 of FIG. 5, logic flow 600 of FIG. 6, and storage medium 700 of FIG. 7. In various embodiments, device 800 may comprise a logic circuit 828. The logic circuit 828 may include physical circuits to perform operations described for RNC and node B 102 of FIGS. 1, 2, and 3, UE 106 of FIGS. 1, 2, and 3, logic flow 400 of FIG. 4, logic flow 500 of FIG. 5, and logic flow 600 of FIG. 6, for example. As shown in FIG. 8, device 800 may include a radio interface 810, baseband circuitry 820, and computing platform 830, although the embodiments are not limited to this configuration.

The device 800 may implement some or all of the structure and/or operations for RNC and node B 102 of FIGS. 1, 2, and 3, UE 106 of FIGS. 1, 2, and 3, logic flow 400 of FIG. 4, logic flow 500 of FIG. 5, logic flow 600 of FIG. 6, storage medium 700 of FIG. 7, and logic circuit 828 in a single computing entity, such as entirely within a single device. Alternatively, the device 800 may distribute portions of the structure and/or operations for RNC and of node B 102 of FIGS. 1, 2, and 3, UE 106 of FIGS. 1, 2, and 3, logic flow 400 of FIG. 4, logic flow 500 of FIG. 5, logic flow 600 of FIG. 6, storage medium 700 of FIG. 7, and logic circuit 828 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving code division multiple access (CDMA), single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 810 may include, for example, a receiver 812, a frequency synthesizer 814, and/or a transmitter 816. Radio interface 810 may include bias controls, a crystal oscillator and/or one or more antennas 818-$f$. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a medium access control (MAC) processing circuit 827 for MAC/data link layer processing. Baseband circuitry 820 may include a memory controller 832 for communicating with MAC processing circuit 827 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames. Alternatively or in addition, MAC processing circuit 827 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for RNC and node B 102 of FIGS. 1, 2, and 3, UE 106 of FIGS. 1, 2, and 3, logic flow 400 of FIG. 4, logic flow 500 of FIG. 5, logic flow 600 of FIG. 6, storage medium 700 of FIG. 7, and logic circuit 828 using the processing component 840. The processing component 840 (and/or PHY 826 and/or MAC 827) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using single input single output (SISO) architectures. However, certain implementations may include multiple antennas (e.g., antennas 818-f) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
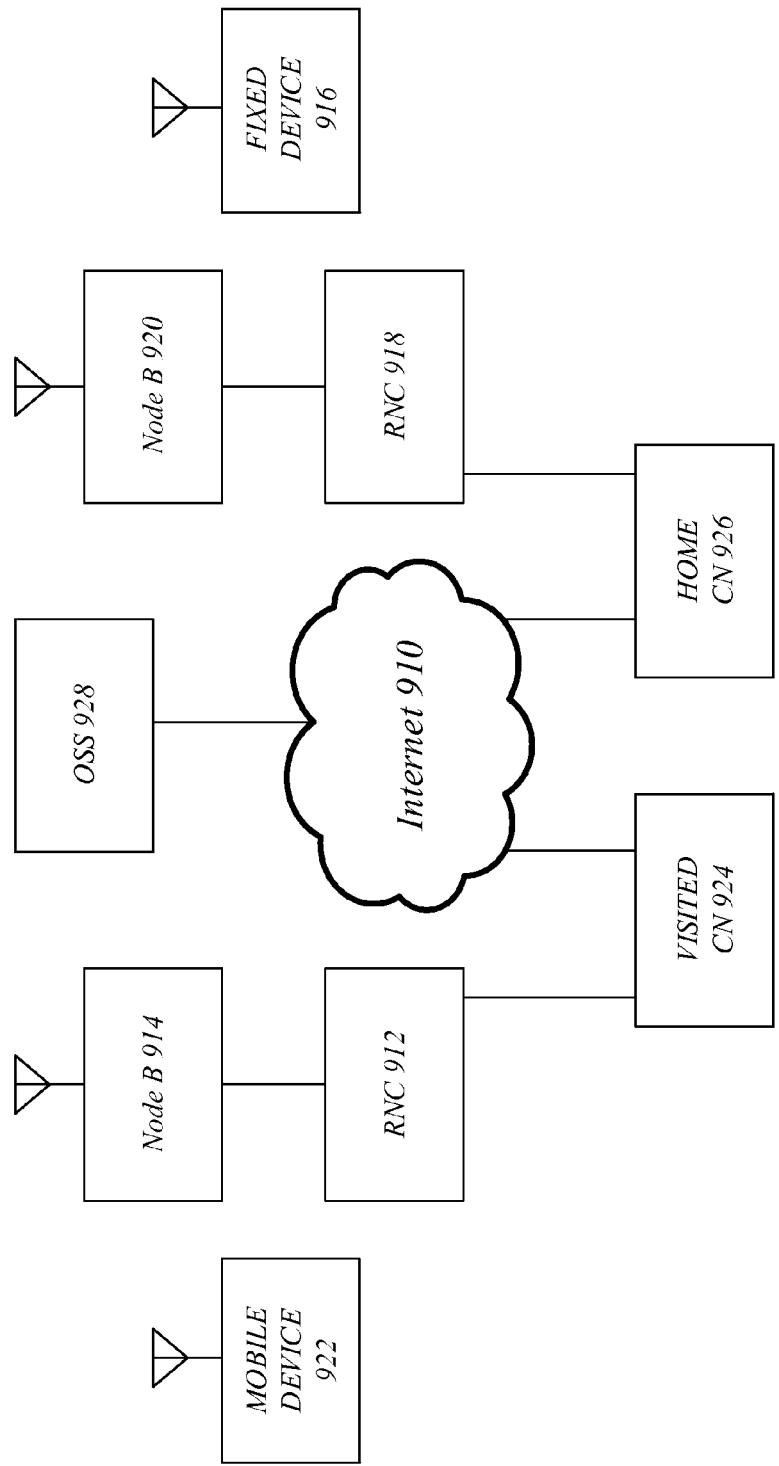
FIG. 9 illustrates an embodiment of a wireless network.

FIG. 9 illustrates an embodiment of a broadband wireless access system 900. As shown in FIG. 9, broadband wireless access system 900 may be an internet protocol (IP) type network comprising an internet 910 type network or the like that is capable of supporting mobile wireless access and/or fixed wireless access to internet 910. In one or more embodiments, broadband wireless access system 900 may comprise any type of code division multiple access (CDMA), orthogonal frequency division multiple access (OFDMA)-based or single-carrier frequency division multiple access (SC-FDMA)-based wireless network, such as a system compliant with one or more of the 3GPP UMTS Specifications, 3GPP LTE Specifications and/or IEEE 802.16 Standards, and the scope of the claimed subject matter is not limited in these respects.

In the exemplary broadband wireless access system 900, radio network controllers (RNCs) 912 and 918 are capable of coupling with node Bs 914 and 920, respectively, to provide wireless communication between one or more fixed devices 916 and internet 910 and/or between one or more mobile devices 922 and Internet 910. One example of a fixed device 916 and a mobile device 922 is device 800 of FIG.

8, with the fixed device 916 comprising a stationary version of device 800 and the mobile device 922 comprising a mobile version of device 800. RNCs 912 and 918 may implement profiles that are capable of defining the mapping of network functions to one or more physical entities on broadband wireless access system 900. Node Bs 914 and 920 may comprise radio equipment to provide RF communication with fixed device 916 and/or mobile device 922, such as described with reference to device 800, and may comprise, for example, the PHY and MAC layer equipment in compliance with a 3GPP UMTS Specifications, 3GPP LTE Specification or an IEEE 802.16 Standard. Node Bs 914 and 920 may further comprise an IP backplane to couple to Internet 910 via RANs 912 and 918, respectively, although the scope of the claimed subject matter is not limited in these respects.

Broadband wireless access system 900 may further comprise a visited core network (CN) 924 and/or a home CN 926, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 924 and/or home CN 926, and the scope of the claimed subject matter is not limited in these respects. Visited CN 924 may be referred to as a visited CN in the case where visited CN 924 is not part of the regular service provider of fixed device 916 or mobile device 922, for example where fixed device 916 or mobile device 922 is roaming away from its respective home CN 926, or where broadband wireless access system 900 is part of the regular service provider of fixed device 916 or mobile device 922 but where broadband wireless access system 900 may be in another location or state that is not the main or home location of fixed device 916 or mobile device 922. The embodiments are not limited in this context.

Fixed device 916 may be located anywhere within range of one or both of node Bs 914 and 920, such as in or near a home or business to provide home or business customer broadband access to Internet 910 via node Bs 914 and 920 and RNCs 912 and 918, respectively, and home CN 926. It is worthy of note that although fixed device 916 is generally disposed in a stationary location, it may be moved to different locations as needed. Mobile device 922 may be utilized at one or more locations if mobile device 922 is within range of one or both of node Bs 914 and 920, for example. In accordance with one or more embodiments, operation support system (OSS) 928 may be part of broadband wireless access system 900 to provide management functions for broadband wireless access system 900 and to provide interfaces between functional entities of broadband wireless access system 900. Broadband wireless access system 900 of FIG. 9 is merely one type of wireless network showing a certain number of the components of broadband wireless access system 900, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is user equipment (UE), comprising: logic, at least a portion of which is in hardware, the logic to receive a measurement control message comprising a remotely-selected event evaluation blacklist (EEB) for a wireless communication frequency, determine whether a local EEB exists for the wireless communication frequency, and in response to a determination that a local EEB exists for the wireless communication frequency, replace the contents of the local EEB with the contents of the remotely-selected EEB.

Example 2 is the UE of Example 1, the logic to create a local EEB for the wireless communication frequency in response to a determination that no local EEB exists for the wireless communication frequency, the local EEB to comprise the contents of the remotely-selected EEB.

Example 3 is the UE of Example 1, the wireless communication frequency to comprise a non-used frequency of the UE, the measurement control message to comprise an inter-frequency measurement reporting criteria information element (IE) containing the remotely-selected EEB.

Example 4 is the UE of Example 3, the inter-frequency measurement reporting criteria IE to comprise a frequency information IE indicating that the remotely-selected EEB applies to the non-used frequency.

Example 5 is the UE of Example 4, the inter-frequency measurement reporting criteria IE to contain a second remotely-selected EEB that applies to a second non-used frequency of the UE, the frequency information IE to indicate that the second remotely-selected EEB applies to the second non-used frequency.

Example 6 is the UE of Example 1, the wireless communication frequency to comprise a secondary uplink (UL) frequency of the UE, the measurement control message to comprise an inter-frequency measurement reporting criteria information element (IE) containing the remotely-selected EEB.

Example 7 is the UE of Example 1, the wireless communication frequency to comprise a used frequency of the UE, the measurement control message to comprise an intra-frequency measurement reporting criteria information element (IE) containing the remotely-selected EEB.

Example 8 is the UE of Example 1, the logic to receive a release notification indicating a release of a measurement identity associated with one or more measurements configured for the wireless communication frequency and, in response to a determination that the measurement identity differs from a measurement identity associated with the measurement control message, maintain the local EEB.

Example 9 is the UE of any of Examples 1 to 8, comprising: at least one radio frequency (RF) transceiver; and at least one RF antenna.

Example 10 is the UE of Example 9, comprising a touchscreen display.

Example 11 is at least one non-transitory computer-readable storage medium comprising a set of wireless communication instructions that, in response to being executed on user equipment (UE), cause the UE to: receive a measurement control message over a downlink control channel (DCCH), the measurement control message to comprise an inter-frequency event evaluation blacklist and an information element (IE) indicating a frequency to which the inter-frequency event evaluation blacklist applies, the inter-frequency event evaluation blacklist to identify one or more detected set cells; and exclude the one or more detected set cells from one or more inter-frequency measurement event evaluations for the indicated frequency.

Example 12 is the at least one non-transitory computer-readable storage medium of Example 11, the inter-frequency event evaluation blacklist to be comprised in a "Cells to be excluded in non-used frequency detected cells" IE.

Example 13 is the at least one non-transitory computer-readable storage medium of Example 11, comprising wireless communication instructions that, in response to being executed on the UE, cause the UE to: determine whether a local inter-frequency event evaluation blacklist exists for the indicated frequency in response to receipt of the measurement control message; and in response to a determination that a local inter-frequency event evaluation blacklist exists for the indicated frequency, replace the contents of the local inter-frequency event evaluation blacklist with the contents of the inter-frequency event evaluation blacklist comprised in the measurement control message.

Example 14 is the at least one non-transitory computer-readable storage medium of Example 13, comprising wireless communication instructions that, in response to being executed on the UE, cause the UE to create a local inter-frequency event evaluation blacklist for the indicated frequency in response to a determination that no local inter-frequency event evaluation blacklist exists for the indicated frequency.

Example 15 is the at least one non-transitory computer-readable storage medium of Example 11, the measurement control message to comprise an "Inter-frequency measurement reporting criteria" IE containing a frequency information IE that comprises the indicated frequency.

Example 16 is the at least one non-transitory computer-readable storage medium of Example 11, the indicated frequency to comprise a non-used frequency of the UE.

Example 17 is the at least one non-transitory computer-readable storage medium of Example 11, the indicated frequency to comprise a secondary uplink (UL) frequency of the UE.

Example 18 is the at least one non-transitory computer-readable storage medium of Example 11, comprising wireless communication instructions that, in response to being executed on the UE, cause the UE to exclude one or more detected set cells from one or more inter-frequency measurement event evaluations for a second frequency based on a local event evaluation blacklist for the second frequency.

Example 19 is a wireless communication method, comprising: receiving, at user equipment (UE), a measurement control message containing an intra-frequency event evaluation blacklist (EEB) that comprises a list of one or more intra-frequency detected set cells; provisioning a local intra-frequency EEB with the contents of the intra-frequency EEB comprised in the measurement control message; performing, by logic circuitry of the UE, a set of intra-frequency event evaluations; and excluding the one or more intra-frequency detected set cells from the set of intra-frequency event evaluations.

Example 20 is the wireless communication method of Example 19, the provisioning of the local intra-frequency EEB comprising creating the local intra-frequency EEB.

Example 21 is the wireless communication method of Example 19, the provisioning of the local intra-frequency EEB comprising replacing existing contents of the local intra-frequency EEB with the contents of the intra-frequency EEB comprised in the measurement control message.

Example 22 is the wireless communication method of Example 19, the intra-frequency EEB comprising a "Cells to be excluded in detected set cells" information element (IE).

Example 23 is the wireless communication method of Example 19, the set of intra-frequency event evaluations comprising an evaluation of one or more of intra-frequency measurement events 1a, 1d, and 1e in accordance with 3rd Generation Partnership Project (3GPP) Technical Specification 25.331 v. 11.9.0.

Example 24 is the wireless communication method of Example 19, comprising: receiving a measurement release message indicating that a set of configured intra-frequency measurements is to be released, the measurement release message identifying a measurement identity (ID) associated with the set of configured intra-frequency measurements; and maintaining the local intra-frequency EEB in response to a determination that the measurement ID associated with the set of configured intra-frequency measurements does not match a measurement ID comprised in the measurement control message.

Example 25 is the wireless communication method of Example 19, the measurement control message comprising an intra-frequency measurement reporting criteria information element (IE) that contains the intra-frequency EEB.

Example 26 is the wireless communication method of Example 19, comprising: receiving a second measurement control message comprising an EEB for a secondary uplink (UL) frequency of the UE; and provisioning a local inter-frequency EEB with the contents of the EEB for the secondary UL frequency.

Example 27 is at least one non-transitory computer-readable storage medium comprising a set of instructions that, in response to being executed on a computing device, cause the computing device to perform a wireless communication method according to any of Examples 19 to 26.

Example 28 is an apparatus, comprising means for performing a wireless communication method according to any of Examples 19 to 26.

Example 29 is a system, comprising: an apparatus according to Example 28; at least one radio frequency (RF) transceiver; and at least one RF antenna.

Example 30 is the system of Example 29, comprising a touchscreen display.

Example 31 is user equipment (UE), comprising: means for receiving a measurement control message over a downlink control channel (DCCH), the measurement control message to comprise an inter-frequency event evaluation blacklist and an information element (IE) indicating a frequency to which the inter-frequency event evaluation blacklist applies, the inter-frequency event evaluation blacklist to identify one or more detected set cells; and means for excluding the one or more detected set cells from one or more inter-frequency measurement event evaluations for the indicated frequency.

Example 32 is the UE of Example 31, the inter-frequency event evaluation blacklist to be comprised in a "Cells to be excluded in non-used frequency detected cells" IE.

Example 33 is the UE of Example 31, comprising: means for determining whether a local inter-frequency event evaluation blacklist exists for the indicated frequency in response to receipt of the measurement control message; and means for replacing the contents of the local inter-frequency event evaluation blacklist with the contents of the inter-frequency event evaluation blacklist comprised in the measurement control message in response to a determination that a local inter-frequency event evaluation blacklist exists for the indicated frequency.

Example 34 is the UE of Example 33, comprising means for creating a local inter-frequency event evaluation blacklist for the indicated frequency in response to a determination that no local inter-frequency event evaluation blacklist exists for the indicated frequency.

Example 35 is the UE of Example 31, the measurement control message to comprise an "Inter-frequency measurement reporting criteria" IE containing a frequency information IE that comprises the indicated frequency.

Example 36 is the UE of Example 31, the indicated frequency to comprise a non-used frequency of the UE.

Example 37 is the UE of Example 31, the indicated frequency to comprise a secondary uplink (UL) frequency of the UE.

Example 38 is the UE of Example 31, comprising means for excluding one or more detected set cells from one or more inter-frequency measurement event evaluations for a second frequency based on a local event evaluation blacklist for the second frequency.

Example 39 is the UE of any of Examples 31 to 38, comprising: at least one radio frequency (RF) transceiver; and at least one RF antenna.

Example 40 is the UE of Example 39, comprising a touchscreen display.

Example 41 is at least one non-transitory computer-readable storage medium comprising a set of wireless communication instructions that, in response to being executed on user equipment (UE), cause the UE to: receive a measurement control message containing an intra-frequency event evaluation blacklist (EEB) that comprises a list of one or more intra-frequency detected set cells; provision a local intra-frequency EEB with the contents of the intra-frequency EEB comprised in the measurement control message; perform a set of intra-frequency event evaluations; and exclude the one or more intra-frequency detected set cells from the set of intra-frequency event evaluations.

Example 42 is the at least one non-transitory computer-readable storage medium of Example 41, the provisioning of the local intra-frequency EEB comprising creating the local intra-frequency EEB.

Example 43 is the at least one non-transitory computer-readable storage medium of Example 41, the provisioning of the local intra-frequency EEB comprising replacing existing contents of the local intra-frequency EEB with the contents of the intra-frequency EEB comprised in the measurement control message.

Example 44 is the at least one non-transitory computer-readable storage medium of Example 41, the intra-frequency EEB comprising a "Cells to be excluded in detected set cells" information element (IE).

Example 45 is the at least one non-transitory computer-readable storage medium of Example 41, the set of intra-frequency event evaluations comprising an evaluation of one or more of intra-frequency measurement events 1a, 1d, and 1e in accordance with 3rd Generation Partnership Project (3GPP) Technical Specification 25.331 v. 11.9.0.

Example 46 is the at least one non-transitory computer-readable storage medium of Example 41, comprising wireless communication instructions that, in response to being executed on the UE, cause the UE to: receive a measurement release message indicating that a set of configured intra-frequency measurements is to be released, the measurement release message identifying a measurement identity (ID) associated with the set of configured intra-frequency measurements; and maintain the local intra-frequency EEB in response to a determination that the measurement ID associated with the set of configured intra-frequency measurements does not match a measurement ID comprised in the measurement control message.

Example 47 is the at least one non-transitory computer-readable storage medium of Example 41, the measurement control message comprising an intra-frequency measurement reporting criteria information element (IE) that contains the intra-frequency EEB.

Example 48 is the at least one non-transitory computer-readable storage medium of Example 41, comprising wireless communication instructions that, in response to being executed on the UE, cause the UE to: receive a second measurement control message comprising an EEB for a secondary uplink (UL) frequency of the UE; and provision a local inter-frequency EEB with the contents of the EEB for the secondary UL frequency.

Example 49 is a wireless communication method, comprising: receiving a measurement control message comprising a remotely-selected event evaluation blacklist (EEB) for a wireless communication frequency; determining, by processing circuitry, whether a local EEB exists for the wireless communication frequency; and replacing the contents of the local EEB with the contents of the remotely-selected EEB in response to a determination that a local EEB exists for the wireless communication frequency.

Example 50 is the wireless communication method of Example 49, comprising creating a local EEB for the wireless communication frequency in response to a determination that no local EEB exists for the wireless communication frequency, the local EEB to comprise the contents of the remotely-selected EEB.

Example 51 is the wireless communication method of Example 49, the wireless communication frequency to comprise a non-used frequency of the UE, the measurement control message to comprise an inter-frequency measurement reporting criteria information element (IE) containing the remotely-selected EEB.

Example 52 is the wireless communication method of Example 51, the inter-frequency measurement reporting criteria IE to comprise a frequency information IE indicating that the remotely-selected EEB applies to the non-used frequency.

Example 53 is the wireless communication method of Example 52, the inter-frequency measurement reporting criteria IE to contain a second remotely-selected EEB that applies to a second non-used frequency of the UE, the frequency information IE to indicate that the second remotely-selected EEB applies to the second non-used frequency.

Example 54 is the wireless communication method of Example 49, the wireless communication frequency to comprise a secondary uplink (UL) frequency of the UE, the measurement control message to comprise an inter-frequency measurement reporting criteria information element (IE) containing the remotely-selected EEB.

Example 55 is the wireless communication method of Example 49, the wireless communication frequency to comprise a used frequency of the UE, the measurement control message to comprise an intra-frequency measurement reporting criteria information element (IE) containing the remotely-selected EEB.

Example 56 is the wireless communication method of Example 49, comprising: receiving a release notification indicating a release of a measurement identity associated with one or more measurements configured for the wireless communication frequency; and maintaining the local EEB in response to a determination that the measurement identity differs from a measurement identity associated with the measurement control message.

Example 57 is at least one non-transitory computer-readable storage medium comprising a set of instructions that, in response to being executed on a computing device, cause the computing device to perform a wireless communication method according to any of Examples 49 to 56.

Example 58 is an apparatus, comprising means for performing a wireless communication method according to any of Examples 49 to 56.

Example 59 is a system, comprising: an apparatus according to Example 58; at least one radio frequency (RF) transceiver; and at least one RF antenna.

Example 60 is the system of Example 59, comprising a touchscreen display.

Example 61 is user equipment (UE), comprising: means for receiving a measurement control message containing an intra-frequency event evaluation blacklist (EEB) that comprises a list of one or more intra-frequency detected set cells; means for provisioning a local intra-frequency EEB with the contents of the intra-frequency EEB comprised in the measurement control message; means for performing a set of intra-frequency event evaluations; and means for excluding the one or more intra-frequency detected set cells from the set of intra-frequency event evaluations.

Example 62 is the UE of Example 61, the provisioning of the local intra-frequency EEB comprising creating the local intra-frequency EEB.

Example 63 is the UE of Example 61, the provisioning of the local intra-frequency EEB comprising replacing existing contents of the local intra-frequency EEB with the contents of the intra-frequency EEB comprised in the measurement control message.

Example 64 is the UE of Example 61, the intra-frequency EEB comprising a "Cells to be excluded in detected set cells" information element (IE).

Example 65 is the UE of Example 61, the set of intra-frequency event evaluations comprising an evaluation of one or more of intra-frequency measurement events 1a, 1d, and 1e in accordance with 3rd Generation Partnership Project (3GPP) Technical Specification 25.331 v. 11.9.0.

Example 66 is the UE of Example 61, comprising: means for receiving a measurement release message indicating that a set of configured intra-frequency measurements is to be released, the measurement release message identifying a measurement identity (ID) associated with the set of configured intra-frequency measurements; and means for maintaining the local intra-frequency EEB in response to a determination that the measurement ID associated with the set of configured intra-frequency measurements does not match a measurement ID comprised in the measurement control message.

Example 67 is the UE of Example 61, the measurement control message comprising an intra-frequency measurement reporting criteria information element (IE) that contains the intra-frequency EEB.

Example 68 is the UE of Example 61, comprising: means for receiving a second measurement control message comprising an EEB for a secondary uplink (UL) frequency of the UE; and means for provisioning a local inter-frequency EEB with the contents of the EEB for the secondary UL frequency.

Example 69 is the UE of any of Examples 61 to 68, comprising: at least one radio frequency (RF) transceiver; and at least one RF antenna.

Example 70 is the UE of Example 69, comprising a touchscreen display.

Example 71 is at least one non-transitory computer-readable storage medium comprising a set of wireless communication instructions that, in response to being executed on user equipment (UE), cause the UE to: receive a measurement control message comprising a remotely-selected event evaluation blacklist (EEB) for a wireless communication frequency; determine whether a local EEB exists for the wireless communication frequency; and replace the contents of the local EEB with the contents of the remotely-selected EEB in response to a determination that a local EEB exists for the wireless communication frequency.

Example 72 is the at least one non-transitory computer-readable storage medium of Example 71, comprising wireless communication instructions that, in response to being executed on the UE, cause the UE to create a local EEB for the wireless communication frequency in response to a determination that no local EEB exists for the wireless communication frequency, the local EEB to comprise the contents of the remotely-selected EEB.

Example 73 is the at least one non-transitory computer-readable storage medium of Example 71, the wireless communication frequency to comprise a non-used frequency of the UE, the measurement control message to comprise an inter-frequency measurement reporting criteria information element (IE) containing the remotely-selected EEB.

Example 74 is the at least one non-transitory computer-readable storage medium of Example 73, the inter-frequency measurement reporting criteria IE to comprise a frequency information IE indicating that the remotely-selected EEB applies to the non-used frequency.

Example 75 is the at least one non-transitory computer-readable storage medium of Example 74, the inter-frequency measurement reporting criteria IE to contain a second remotely-selected EEB that applies to a second non-used frequency of the UE, the frequency information IE to indicate that the second remotely-selected EEB applies to the second non-used frequency.

Example 76 is the at least one non-transitory computer-readable storage medium of Example 71, the wireless communication frequency to comprise a secondary uplink (UL) frequency of the UE, the measurement control message to comprise an inter-frequency measurement reporting criteria information element (IE) containing the remotely-selected EEB.

Example 77 is the at least one non-transitory computer-readable storage medium of Example 71, the wireless communication frequency to comprise a used frequency of the UE, the measurement control message to comprise an intra-frequency measurement reporting criteria information element (IE) containing the remotely-selected EEB.

Example 78 is the at least one non-transitory computer-readable storage medium of Example 71, comprising wireless communication instructions that, in response to being executed on the UE, cause the UE to: receive a release notification indicating a release of a measurement identity associated with one or more measurements configured for the wireless communication frequency; and maintain the local EEB in response to a determination that the measurement identity differs from a measurement identity associated with the measurement control message.

Example 79 is user equipment (UE), comprising: logic, at least a portion of which is in hardware, the logic to receive a measurement control message over a downlink control channel (DCCH), the measurement control message to comprise an inter-frequency event evaluation blacklist and an information element (IE) indicating a frequency to which the inter-frequency event evaluation blacklist applies, the inter-frequency event evaluation blacklist to identify one or more detected set cells, the logic to exclude the one or more detected set cells from one or more inter-frequency measurement event evaluations for the indicated frequency.

Example 80 is the UE of Example 79, the inter-frequency event evaluation blacklist to be comprised in a "Cells to be excluded in non-used frequency detected cells" IE.

Example 81 is the UE of Example 79, the logic to determine whether a local inter-frequency event evaluation blacklist exists for the indicated frequency in response to receipt of the measurement control message and, in response to a determination that a local inter-frequency event evaluation blacklist exists for the indicated frequency, replace the contents of the local inter-frequency event evaluation blacklist with the contents of the inter-frequency event evaluation blacklist comprised in the measurement control message.

Example 82 is the UE of Example 81, the logic to create a local inter-frequency event evaluation blacklist for the indicated frequency in response to a determination that no local inter-frequency event evaluation blacklist exists for the indicated frequency.

Example 83 is the UE of Example 79, the measurement control message to comprise an "Inter-frequency measurement reporting criteria" IE containing a frequency information IE that comprises the indicated frequency.

Example 84 is the UE of Example 79, the indicated frequency to comprise a non-used frequency of the UE.

Example 85 is the UE of Example 79, the indicated frequency to comprise a secondary uplink (UL) frequency of the UE.

Example 86 is the UE of Example 79, the logic to exclude one or more detected set cells from one or more inter-frequency measurement event evaluations for a second frequency based on a local event evaluation blacklist for the second frequency.

Example 87 is the UE of any of Examples 79 to 86, comprising: at least one radio frequency (RF) transceiver; and at least one RF antenna.

Example 88 is the UE of Example 87, comprising a touchscreen display.

Example 89 is user equipment (UE), comprising: means for receiving a measurement control message comprising a remotely-selected event evaluation blacklist (EEB) for a wireless communication frequency; means for determining whether a local EEB exists for the wireless communication frequency; and means for replacing the contents of the local EEB with the contents of the remotely-selected EEB in response to a determination that a local EEB exists for the wireless communication frequency.

Example 90 is the UE of Example 89, comprising means for creating a local EEB for the wireless communication frequency in response to a determination that no local EEB exists for the wireless communication frequency, the local EEB to comprise the contents of the remotely-selected EEB.

Example 91 is the UE of Example 89, the wireless communication frequency to comprise a non-used frequency of the UE, the measurement control message to comprise an inter-frequency measurement reporting criteria information element (IE) containing the remotely-selected EEB.

Example 92 is the UE of Example 91, the inter-frequency measurement reporting criteria IE to comprise a frequency information IE indicating that the remotely-selected EEB applies to the non-used frequency.

Example 93 is the UE of Example 92, the inter-frequency measurement reporting criteria IE to contain a second remotely-selected EEB that applies to a second non-used frequency of the UE, the frequency information IE to indicate that the second remotely-selected EEB applies to the second non-used frequency.

Example 94 is the UE of Example 89, the wireless communication frequency to comprise a secondary uplink (UL) frequency of the UE, the measurement control message to comprise an inter-frequency measurement reporting criteria information element (IE) containing the remotely-selected EEB.

Example 95 is the UE of Example 89, the wireless communication frequency to comprise a used frequency of the UE, the measurement control message to comprise an intra-frequency measurement reporting criteria information element (IE) containing the remotely-selected EEB.

Example 96 is the UE of Example 89, comprising: means for receiving a release notification indicating a release of a measurement identity associated with one or more measurements configured for the wireless communication frequency; and means for maintaining the local EEB in response to a determination that the measurement identity differs from a measurement identity associated with the measurement control message.

Example 97 is the UE of any of Examples 89 to 96, comprising: at least one radio frequency (RF) transceiver; and at least one RF antenna.

Example 98 is the UE of Example 97, comprising a touchscreen display.

Example 99 is a wireless communication method, comprising: receiving a measurement control message over a downlink control channel (DCCH), the measurement control message to comprise an inter-frequency event evaluation blacklist and an information element (IE) indicating a frequency to which the inter-frequency event evaluation blacklist applies, the inter-frequency event evaluation blacklist to identify one or more detected set cells; and excluding, by processing circuitry, the one or more detected set cells from one or more inter-frequency measurement event evaluations for the indicated frequency.

Example 100 is the wireless communication method of Example 99, the inter-frequency event evaluation blacklist to be comprised in a "Cells to be excluded in non-used frequency detected cells" IE.

Example 101 is the wireless communication method of Example 99, comprising: determining whether a local inter-frequency event evaluation blacklist exists for the indicated frequency in response to receipt of the measurement control message; and replacing the contents of the local inter-frequency event evaluation blacklist with the contents of the inter-frequency event evaluation blacklist comprised in the measurement control message in response to a determination that a local inter-frequency event evaluation blacklist exists for the indicated frequency.

Example 102 is the wireless communication method of Example 101, comprising creating a local inter-frequency event evaluation blacklist for the indicated frequency in response to a determination that no local inter-frequency event evaluation blacklist exists for the indicated frequency.

Example 103 is the wireless communication method of Example 99, the measurement control message to comprise an "Inter-frequency measurement reporting criteria" IE containing a frequency information IE that comprises the indicated frequency.

Example 104 is the wireless communication method of Example 99, the indicated frequency to comprise a non-used frequency of the UE.

Example 105 is the wireless communication method of Example 99, the indicated frequency to comprise a secondary uplink (UL) frequency of the UE.

Example 106 is the wireless communication method of Example 99, comprising excluding one or more detected set cells from one or more inter-frequency measurement event evaluations for a second frequency based on a local event evaluation blacklist for the second frequency.

Example 107 is at least one non-transitory computer-readable storage medium comprising a set of instructions that, in response to being executed on a computing device, cause the computing device to perform a wireless communication method according to any of Examples 99 to 106.

Example 108 is an apparatus, comprising means for performing a wireless communication method according to any of Examples 99 to 106.

Example 109 is a system, comprising: an apparatus according to Example 108; at least one radio frequency (RF) transceiver; and at least one RF antenna.

Example 110 is the system of Example 109, comprising a touchscreen display.

Example 111 is user equipment (UE), comprising: logic, at least a portion of which is in hardware, the logic to receive a measurement control message containing an intra-frequency event evaluation blacklist (EEB) that comprises a list of one or more intra-frequency detected set cells, provision a local intra-frequency EEB with the contents of the intra-frequency EEB comprised in the measurement control message, perform a set of intra-frequency event evaluations, and exclude the one or more intra-frequency detected set cells from the set of intra-frequency event evaluations.

Example 112 is the UE of Example 111, the provisioning of the local intra-frequency EEB comprising creating the local intra-frequency EEB.

Example 113 is the UE of Example 111, the provisioning of the local intra-frequency EEB comprising replacing existing contents of the local intra-frequency EEB with the contents of the intra-frequency EEB comprised in the measurement control message.

Example 114 is the UE of Example 111, the intra-frequency EEB comprising a "Cells to be excluded in detected set cells" information element (IE).

Example 115 is the UE of Example 111, the set of intra-frequency event evaluations comprising an evaluation of one or more of intra-frequency measurement events 1a, 1d, and 1e in accordance with 3rd Generation Partnership Project (3GPP) Technical Specification 25.331 v. 11.9.0.

Example 116 is the UE of Example 111, the logic to receive a measurement release message indicating that a set of configured intra-frequency measurements is to be released, the measurement release message identifying a measurement identity (ID) associated with the set of configured intra-frequency measurements, the logic to maintain the local intra-frequency EEB in response to a determination that the measurement ID associated with the set of configured intra-frequency measurements does not match a measurement ID comprised in the measurement control message.

Example 117 is the UE of Example 111, the measurement control message comprising an intra-frequency measurement reporting criteria information element (IE) that contains the intra-frequency EEB.

Example 118 is the UE of Example 111, the logic to receive a second measurement control message comprising an EEB for a secondary uplink (UL) frequency of the UE and provision a local inter-frequency EEB with the contents of the EEB for the secondary UL frequency.

Example 119 is the UE of any of Examples 111 to 118, comprising: at least one radio frequency (RF) transceiver; and at least one RF antenna.

Example 120 is the UE of Example 119, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory; and
   circuitry coupled to the memory, the circuitry to:
      access a received measurement control message comprising an inter-frequency measurement reporting criteria information element (IE), the inter-frequency measurement reporting criteria IE to comprise an inter-frequency measurement reporting blacklist and a frequency information IE, the frequency information IE to identify a non-used frequency of user equipment (UE); and
      produce a local inter-frequency measurement reporting blacklist for the non-used frequency based on the contents of the inter-frequency measurement reporting blacklist comprised in the inter-frequency measurement reporting criteria IE.

2. The apparatus of claim 1, the circuitry to configure the local inter-frequency measurement reporting blacklist for the non-used frequency by replacement of the contents of an existing local inter-frequency measurement reporting blacklist for the non-used frequency with the contents of the inter-frequency measurement reporting blacklist comprised in the inter-frequency measurement reporting criteria IE.

3. The apparatus of claim 1, the circuitry to create the local inter-frequency measurement reporting blacklist for the non-used frequency in response to a determination that no local inter-frequency measurement reporting blacklist exists for the non-used frequency.

4. The apparatus of claim 1, the inter-frequency measurement reporting blacklist to comprise a list of one or more cells comprised among a detected set of the UE for the non-used frequency.

5. The apparatus of claim 1, the measurement control message to comprise a plurality of inter-frequency measurement reporting blacklists, each of the plurality of inter-frequency measurement reporting blacklists to correspond to a respective one of a plurality of non-used frequencies of the UE.

6. The apparatus of claim 1, the measurement control message to comprise a measurement command IE containing a value to indicate that the measurement control message is intended to modify a measurement.

7. The apparatus of claim 6, the measurement control message to comprise a measurement identity IE containing an identifier associated with the measurement to be modified.

8. The apparatus of claim 1, the measurement control message to be received over a dedicated control channel (DCCH).

9. A system, comprising:
   the apparatus of claim 1;
   one or more radio frequency (RF) transceivers communicatively coupled to the circuitry; and
   one or more RF antennas, each RF antenna communicatively coupled to at least one of the one or more RF transceivers.

10. At least one non-transitory computer-readable storage medium comprising a set of instructions that, in response to being executed on user equipment (UE), cause the UE to:
   access a received measurement control message comprising an inter-frequency measurement reporting criteria information element (IE), the inter-frequency measurement reporting criteria IE to comprise an inter-frequency measurement reporting blacklist and a frequency information IE, the frequency information IE to identify a non-used frequency of the UE; and produce a local inter-frequency measurement reporting blacklist for the non-used frequency based on the contents of the inter-frequency measurement reporting blacklist comprised in the inter-frequency measurement reporting criteria IE.

11. The at least one non-transitory computer-readable storage medium of claim 10, comprising instructions that, in response to being executed on the UE, cause the UE to configure the local inter-frequency measurement reporting blacklist for the non-used frequency by replacement of the contents of an existing local inter-frequency measurement reporting blacklist for the non-used frequency with the contents of the inter-frequency measurement reporting blacklist comprised in the inter-frequency measurement reporting criteria IE.

12. The at least one non-transitory computer-readable storage medium of claim 10, comprising instructions that, in response to being executed on the UE, cause the UE to create the local inter-frequency measurement reporting blacklist for the non-used frequency in response to a determination that no local inter-frequency measurement reporting blacklist exists for the non-used frequency.

13. The at least one non-transitory computer-readable storage medium of claim 10, the inter-frequency measurement reporting blacklist to comprise a list of one or more cells comprised among a detected set of the UE for the non-used frequency.

14. The at least one non-transitory computer-readable storage medium of claim 10, the measurement control message to comprise a plurality of inter-frequency measurement reporting blacklists, each of the plurality of inter-frequency measurement reporting blacklists to correspond to a respective one of a plurality of non-used frequencies of the UE.

15. The at least one non-transitory computer-readable storage medium of claim 10, the measurement control message to comprise a measurement command IE containing a value to indicate that the measurement control message is intended to modify a measurement.

16. The at least one non-transitory computer-readable storage medium of claim 15, the measurement control message to comprise a measurement identity IE containing an identifier associated with the measurement to be modified.

17. The at least one non-transitory computer-readable storage medium of claim 10, the measurement control message to be received over a dedicated control channel (DCCH).

18. User equipment (UE), comprising:
a radio frequency (RF) transceiver;
one or more RF antennas communicatively coupled to the RF transceiver; and
logic, at least a portion of which is in hardware communicatively coupled to the RF transceiver, the logic to access a received measurement control message comprising an inter-frequency measurement reporting criteria information element (IE), the inter-frequency measurement reporting criteria IE to comprise an inter-frequency measurement reporting blacklist and a frequency information IE, the frequency information IE to identify a non-used frequency of the UE, the logic to produce a local inter-frequency measurement reporting blacklist for the non-used frequency based on the contents of the inter-frequency measurement reporting blacklist comprised in the inter-frequency measurement reporting criteria IE.

19. The UE of claim 18, the logic to configure the local inter-frequency measurement reporting blacklist for the non-used frequency by replacement of the contents of an existing local inter-frequency measurement reporting blacklist for the non-used frequency with the contents of the inter-frequency measurement reporting blacklist comprised in the inter-frequency measurement reporting criteria IE.

20. The UE of claim 18, the logic to create the local inter-frequency measurement reporting blacklist for the non-used frequency in response to a determination that no local inter-frequency measurement reporting blacklist exists for the non-used frequency.

21. The UE of claim 18, the inter-frequency measurement reporting blacklist to comprise a list of one or more cells comprised among a detected set of the UE for the non-used frequency.

22. The UE of claim 18, the measurement control message to comprise a plurality of inter-frequency measurement reporting blacklists, each of the plurality of inter-frequency measurement reporting blacklists to correspond to a respective one of a plurality of non-used frequencies of the UE.

23. The UE of claim 18, the measurement control message to comprise a measurement command IE containing a value to indicate that the measurement control message is intended to modify a measurement.

24. The UE of claim 23, the measurement control message to comprise a measurement identity IE containing an identifier associated with the measurement to be modified.

25. The UE of claim 18, the measurement control message to be received over a downlink control channel (DCCH).

* * * * *